United States Patent
Birkenmeyer

[11] 3,892,729
[45] July 1, 1975

[54] 1'(BETA-HYDROXYETHYL)-1'-DEMETHYL CLINDAMYCIN 2-PHOSPHATES

[75] Inventor: Robert D. Birkenmeyer, Galesburg, Mich.

[73] Assignee: The Upjohn Company, Kalamazoo, Mich.

[22] Filed: Dec. 17, 1973

[21] Appl. No.: 425,149

Related U.S. Application Data
[63] Continuation-in-part of Ser. No. 156,099, June 23, 1971, Pat. No. 3,787,390.

[52] U.S. Cl............................ 260/210 R; 424/180
[51] Int. Cl............................................ C08b 19/00
[58] Field of Search................................ 260/210 R

[56] References Cited
UNITED STATES PATENTS
3,487,068  12/1969  Morozowich et al.......... 260/210 R

*Primary Examiner*—Johnnie R. Brown
*Attorney, Agent, or Firm*—John J. Killinger; Roman Saliwanchik

[57] ABSTRACT

1'-($\beta$-Hydroxyethyl)-1'-demethylclindamycin 2-phosphate compounds of the formula:

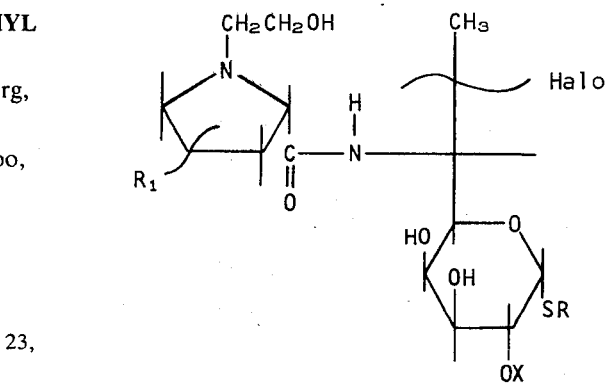

or the acid addition salts thereof wherein Halo is chlorine, bromine, or iodine, X is

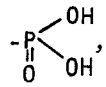

the zwitterion thereof or the hemi-salt thereof; R is alkyl of not more than 4 carbon atoms; and $R_1$ is alkyl of not more than 8 carbon atoms.

The compounds have clindamycin-like antibacterial activity and provide particularly high concentrations of compound in the urinary tract thereby being particularly useful in treating bacterial infections of the upper and lower urinary tract as well as L-forms in the kidney and are especially advantageous in parenteral administration, producing much less pain upon injection than clindamycin or 1'-($\beta$-hydroxyethyl)1'-demethylclindamycin.

3 Claims, No Drawings

1'(BETA-HYDROXYETHYL)-1'-DEMETHYL CLINDAMYCIN 2-PHOSPHATES

CROSS REFERENCE TO RELATED APPLICATIONS

This application is a continuation in part of our copending application Ser. No. 156,099 filed June 23, 1971, now U.S. Pat. No. 3,787,390.

BRIEF SUMMARY OF THE INVENTION

This invention relates to novel compounds and is particularly directed to 1'-($\beta$-hydroxyethyl)-1'-demethylclindamycin 2-phosphates. These compounds in addition to having the antibacterial spectrum of 1'-($\beta$-hydroxyethyl)-1'-demethylclindamycin have been found to produce much less pain upon injection. The compounds are useful in treating bacterial infections, especially by systemic administration, which would commonly be treated by clindamycin or 1'-($\beta$-hydroxyethyl)-1'-demethylclindamycin.

The novel compounds of the invention can be represented by the following structural formula:

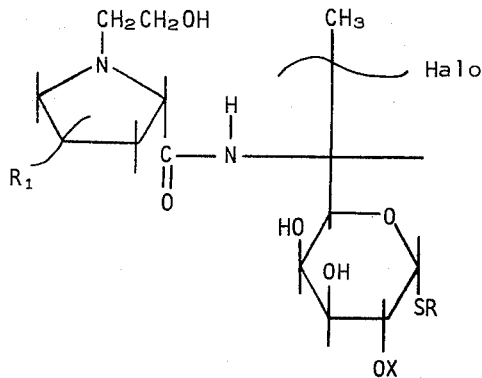

Formula I or the acid addition salts thereof wherein Halo is chlorine, bromine, or iodine; X is

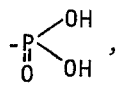

the zwitterion thereof or the hemi-salt thereof; R is alkyl or not more than 4 carbon atoms; and $R_1$ is alkyl of not more than 8 carbon atoms.

Examples of alkyl of not more than 8 carbon atoms ($R_1$) are methyl, ethyl, propyl, butyl, pentyl, hexyl, heptyl, octyl and the isomeric forms thereof.

The starting materials for the preparation of the novel compounds of the present invention are compounds of the Formula I wherein X is hydrogen. The compounds are disclosed and can be prepared by methods set forth in U.S. Pat. application Ser. No. 156,099, filed June 23, 1971, now allowed.

DETAILED DESCRIPTION OF THE INVENTION

The compounds of the present invention are prepared by the following steps starting with a compound of the Formula I wherein X is hydrogen;

I. Protecting the 3- and 4-hydroxy groups by formation of a 3,4-alkylidene or arylidene.

II. Protecting the primary hydroxy by (A) tritylation or (B) silylation or (C) formation of a tetrahydropyranyl ether.

III. Phosphorylation, and

IV. Removal of the protective groups put on in steps I and II.

STEP I

To protect the 3,4-hydroxy groups, a compound of the Formula I wherein X is hydrogen, advantageously as the hydrochloride salt, is first condensed with an alkyl or aryl aldehyde or ketone, with the aid of mild heat, to form the 3,4-O-alkylidene or 3,4-O-arylidene. Acid catalysis of the reaction is unnecessary if the hydrochloride salt is used as this provides sufficient catalysis of the reaction. The reaction can be forced to completion through azeotropic removal of water by an organic solvent, for example, benzene, toluene, chloroform, ethylene chloride, and the like. The azeotrope-forming solvent can be eliminated if water is removed by some other means, such as by evacuation, vaporization with an inert gas, or merely by co-distillation with a solvent which has a higher boiling point than water. The azeotrope-forming solvent is used in admixture with a highly polar solvent, such as N,N-dimethylformamide, N,N-dimethylacetamide, dimethylsulfoxide, N-methyl pyrrolidone, and the like, in order to solubilize the starting compound hydrochloride and thus produce a homogeneous solution.

The condensation reaction can be conducted between temperatures of about 15° to 180° C., the preferred temperature being about 15°–50° for alkylidene and 90°–110° C. for arylidene. The optimum temperature depends on the ratio of polar to non-polar solvent, and on the specific properties of the non-polar solvent, such as the boiling temperature of the azeotrope formed with water as well as the boiling point of the non-polar solvent itself, according to the art. The non-polar solvent containing moisture can be continuously removed by distillation and replaced periodically with fresh, dry solvent. The water also can be removed by condensation and separation with a water trap, or a dessicant can be used, thus permitting the dried solvent to return to the reaction vessel.

The time for complete condensation as disclosed, above, varies with the solvent composition and the efficiency of removal of the water. When azeotrope-forming solvents are used, as described above, the course of the reaction can be followed by measuring the amount of water liberated. Alternatively, the reaction vessel can be sampled periodically and chromatographed. With solvent combinations of benzene and dimethylformamide, reaction times of about 1–16 hours can be used, with 2–3 hours usually being optimum. Typical alkyl ketones useful in the process are acetone, diethyl ketone, methylbutyl ketone, and the like. A variety of aromatic aldehydes can also be used in the process of the invention, for example, furfural, 5-methylfurfural, benzaldehyde, salicylaldehyde, m-tolualdehyde, o-tolualdehyde, p-tolualdehyde, o-chlorobenzaldehyde, m-chlorobenzaldehyde, m-bromobenzaldehyde, p-bromobenzaldehyde, p-methoxybenzaldehyde, m-methoxybenzaldehyde, o-methoxybenzaldehyde, 3,4-dimethoxybenzaldehyde (veratric aldehyde), p-isopropylbenzaldehyde, salicylaldehyde, p-hydroxybenzaldehyde, 3,4,5-trimethoxybenzaldehyde, piperonal, o-nitrobenzaldehyde, p- chlorobenzaldehyde, phthaldehyde, m-nitrobenzaldehyde, p-nitrobenzaldehyde, β-naphthaldehyde, p-bromobenzaldehyde, o-bromobenzaldehyde, 2,4-dichlorobenzaldehyde, vanillin, terephthaldehyde, protocatechualdehyde, and cinnamaldehyde.

Also useful are aldehydes in which the carbonyl group is separated from the aromatic moiety by one or more double bonds giving a conjugated structure of

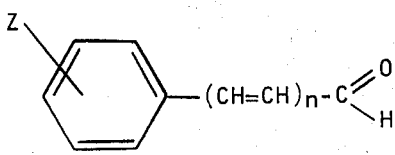

wherein $n$ can be an integer of from 1–4, and Z can be one of the following substituents on the aromatic moiety:

| | | |
|---|---|---|
| $CH_3$ | $OCH_3$ | $NO_2$ |
| $CH_2CH_3$ | $OC_2H_5$ | $SCOCH_3$ |
| $CH(CH_3)_2$ | $O(CH_2)_2CH_3$ | $SCN$ |
| $C(CH_3)_3$ | $OCH(CH_3)_2$ | $SOCH_3$ |
| $3,4-(CH_2)_4$ | $O(CH_2)_3CH_3$ | $SO_2CH_3$ |
| $C_6H_5$ | $O(CH_2)_4CH_3$ | $SO_2NH_2$ |
| $CF_3$ | $OC_6H_5$ | $S(CH_3)_2{}^+$ |
| $CN$ | $OCOCH_3$ | $SO_3{}^-$ |
| $COCH_3$ | $OH$ | $F$ |
| $CO_2C_2H_5$ | $SCH_3$ | $Cl$ |
| $CO_2H$ | $SC_2H_5$ | $Br$ |
| $CH_2Si(CH_3)_3$ | $SCH(CH_3)_2$ | $I$ |
| $Si(CH_3)_3$ | $SH$ | $CH=CHNO_2$ |
| $Si(C_2H_5)_3$ | $NHCOCH_3$ | |
| $PO_3H^-$ | $N(CH_3)_3{}^+$ | |

The acetals formed by the above-disclosed process are initially isolated as crystalline hydrochloride salts. With stable acetals, for example, the 3,4-benzylidene derivatives, and 3,4-p-chlorobenzylidene derivatives, recrystallization of the hydrochlorides can be brought about with hot Methyl Cellosolve, dimethylformamide, chloroform, and the like. The less stable acetals, for example, 3,4-p-anisylidene derivative, 3,4-cinnamylidene, and 3,4-toluylidene derivative must be converted to the free base form before isolation of the acetal.

The 3,4-protected, e.g., arylidene, hydrochloride salts can be converted to the free base by mixing the salts with a basic material, for example, aqueous sodium hydroxide, a quaternary ammonium hydroxide, ammonium hydroxide, or a strong amine base. Basic ion exchange resin can be used. The insoluble arylidene base can be removed by filtration, or it can be extracted with water-immiscible solvents, for example, chloroform, methylene chloride, ethylene dichloride, ether and the like. Alternatively, the 3,4-protected hydrochloride salts can be converted to the free bases by first neutralizing the salt with a base after placing the salt in solution in a solvent such as dimethylformamide, dimethylacetamide, propylene glycol, and the like. The base can be an alkoxide, an amine, ammonia, or a solid inorganic base, for example, sodium hydroxide, potassium hydroxide, and the like. The resulting solutions of the base can be recovered from water-miscible solvents by dilution with water to the cloud point resulting in slow crystallization of the acetals. The solutions of the base in water-immiscible solvents can be recovered by dilution of the solution with a non-polar solvent, for example, hexane, isomeric hexanes, and the like, or by simply evaporating the solvent. The latter procedure for forming the free base from the 3,4-protected hydrochloride salts is suitable for isolating the very labile acetals since a nonaqueous procedure can be employed.

Most of the 3,4-protected bases can be purified by solution of the compound in acetone, diluting the solution with ether, and then adding hexane to the cloud point to induce spontaneous crystallization.

STEP IIA

Trityl ethers of the 3,4-O-protected derivatives are prepared by reacting an excess of trityl halide or substituted trityl halide with the 3,4-arylidene or alkylidene derivatives from Step I in the presence of a strong base and a suitable solvent. The preferred mole ratio of trityl halide or substituted trityl halide to the 3,4-arylidene or alkylidene compound is 4:1. Higher ratios of tritylating agent to 3,4-protected compound can be used (up to about 10:1), although increasing amounts of ditritylated byproducts are formed with a large excess of tritylating agent. Lower mole ratios of tritylating agent to 3,4-protected (below 1:1) result in an incomplete reaction, as well as formation of additional unidentified by-products.

The preferred trityl halide in the above reaction is trityl chloride. However, other trityl halides and substituted trityl halides of the following formula can be used:

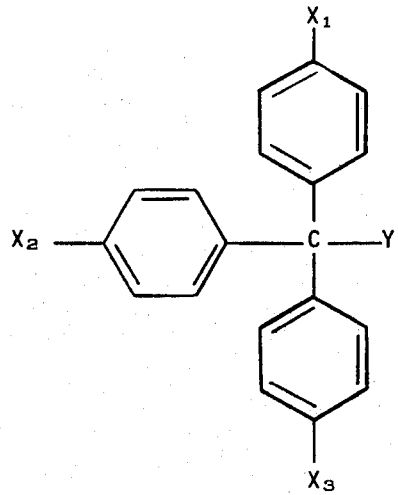

wherein Y is selected from the group consisting of Cl and Br and $X_1$, $X_2$, and $X_3$ are selected from the group consisting of hydrogen, halogen, and $OCH_3$.

The compounds of the type in which the substituents $X_1$, $X_2$, and $X_3$ are mono-, di-, or tri-para-chloro may be made by the methods reported by Gomberg [Ber. 37, 1633 (1904)]. The corresponding compounds in which $X_1$, $X_2$, and $X_3$ are para-methoxy may be prepared by the methods described by Smith, et al., and references therein [J. Am. Chem. Soc., 84, 430 (1962), see page 436].

The preferred solvent for the tritylation is acetone. Other solvents which can be used are 2-butanone, 2-pentanone, 3-pentanone, ether, benzene, N,N-dimethylformamide, N,N-dimethylacetamide, dimethylsulfoxide, methyl acetate, ethyl acetate, pyridine, and the like. Use of the higher boiling polar solvents, however, tends to result in the production of additional by-products from the reaction, whereas the lower boiling solvents do not permit a complete reaction.

The preferred base is triethylamine. Other strongly basic trialkyl amines can be used, for example, triethylenediamine, N-alkylmorpholine derivatives, tripropylamine, tributylamine, and the like. Tertiary bases having a pKa greater than 8 permit a more rapid reaction since better solubility of the 3,4-protected starting compounds is maintained. Weaker bases, such as pyridine, require longer reaction times since 3,4-protected starting compounds are largely insolubilized as the hydrochloride salt in the presence of such a base.

The reaction time is determined by several factors, for example, the boiling point of the solvent, the strength of the base, the concentration and ratio of trityl halide to 3,4-protected compound, and the polarity of the solvent. For example, with the following mole ratio of trityl chloride to anisylidene derivative to triethylamine to acetone of 72:15:16:34, the preferred reaction time at reflux temperature is 24 hours. Reaction times up to 48 hours can be used although increasing amounts of di-tritylated derivatives are formed. Reaction times less than six hours result in appreciable amounts of unchanged anisylidene derivatives. With other mole ratios, the operating reaction time can range from 1 to 100 hours. The course of the reaction can be monitored by paper chromatography or thin layer chromatography (tlc) according to the art.

Upon completion of the tritylation reaction, the 1'-(trityloxyethyl)-3,4-protected derivative is precipitated by the addition of a non-polar solvent such as hexane, heptane, pentane, cyclohexane, benzene, and the like. The crude reaction product is recrystallized repeatedly from hot acetonitrile and finally from hot acetone-water (1:1) mixture to provide a pure preparation of the derivative. Other organic solvents can be used for recrystallization, for example, 2-butanone, 3-pentanone, n-propanol, 2-propanol, butyl acetate, benzene, butyronitrile, N,N-dimethylformamidewater, N,N-dimethylacetamide-water, methanol-water, ethanolwater, and the like.

STEP IIB

Alternatively, the primary hydroxyl of the hydroxyethyl group on the pyrrolidine nitrogen atom may be protected before phosphorylation (Step III) by silylation, for instance with a trimethylsilyl group, according to the art. The silylation is carried out by reacting the 3,4-protected compound with a silylating agent in a suitable solvent. A typical procedure is to react the 3,4-protected compound with excess hexamethylsilazane (a bifunctional silylating agent) with trimethylchlorosilane as a catalyst, in pyridine solution. The reaction occurs readily at ambient temperature and results in the formation of a trimethylsilylprotected derivative. Other operable silylating agents, according to the art, include for example diorganomonochlorosilanes such as diphenylmonochlorosilane, dibenzylmonochlorosilane and methylphenylmonochlorosilane as in British Pat. No. 822,970, referred to in Chemical Abstracts 44, 658 (1950); and other trisubstituted chlorosilanes [Cram and Hammond, "Organic Chemistry" page 257 (1959); Sneed and Brasted, Comprehensive Inorg. Chem. 7, 111 (1958); Roberts and Caserio, "Basic Principles of Org. Chem.," page 1,182 (1964)] from trimethyl- to tribenzylchlorosilanes. An alternative suitable solvent is piperidine. For purification of the silyl ethers the reaction mixture is evaporated to dryness under vacuum, taken up in chloroform, washed with water, filtered through silica gel and evaporated. Other purification according to the art is also possible, and upon completion of 2-phosphorylation according to Step III, the 1-protective silyl group is removed simultaneously with the 3,4-protective group by acid hydrolysis, for example by treatment with acetic acid-water as given below.

STEP IIC

A third method for protecting the primary hydroxyl of the hydroxyethyl group on the pyrrolidine nitrogen atom is by reacting with dihydropyran to form a tetrahydropyranyl ether.

The reaction is carried out at room temperature in an inert solvent such as diethyl ether with a few drops of concentrated hydrochloric acid as a catalyst. After stirring for several hours the acid is neutralized with sodium hydroxide and the solvent evaporated under vacuum. The solid residue may be purified by crystallization or chromatography but is usually pure enough to use in the following step without further treatment.

STEP III

The hydroxyl-protected compound can be phosphorylated by processes already well known in the art, for example, by reacting it with a phosphorylating agent in the presence of an acid-binding agent, for example, a tertiary amine, to produce 1'-demethyl-1'-(trityloxyethyl)-3,4-O-protected clindamycin 2-phosphate. Suitable phosphorylating agents include phosphoryl trichloride (POCl$_3$) dianilinophosphorochloridate, anilinophosphorodichloridate, di-t-butylphosphorochloridate, dimorpholinophosphorobromidate, and cyanoethylphosphate plus dicyclohexylcarbodiimide. Suitable tertiary amines include heterocyclic amines such as pyridine, quinoline, and isoquinoline; trialkylamines such as trimethylamine, triethylamine, triisopropylamine, and the like; N,N-dialkylanilines such as dimethylaniline, diethylaniline, and the like; and N-alkylpiperidines such as N-ethylpiperidine, N-methylpiperidine, and the like. The preferred base is pyridine.

The phosphorylation is advantageously conducted by treating a solution of the hydroxyl-protected compound in a tertiary amine, for example, pyridine, with a phosphorylating agent, for example, phosphoryl chloride, and cooling the reaction mixture to prevent excessive side reactions. Advantageously, the reaction is conducted in pyridine at low temperatures, preferably −38° to −42° C. Temperatures between −50° C. and +10° C. are allowable although appreciable amounts of side-products sometimes arise at higher temperatures. The resulting 2-phosphorodichloridate is hydrolyzed (quenched) with water to the corresponding phosphate ester at temperatures between −40° C. and +10° C. Low temperatures are preferred in order to minimize sideproducts. Thus, upon reacting 1'-demethyl-1'-(β-trityloxyethyl)-3,4-O-protected clindamycin in the presence of a tertiary amine with at least 1 mole of phosphorylating agent, there is obtained 1'-demethyl-1'-(β-trityloxyethyl)-3,4-O-protected clindamycin 2-phosphate.

The 2-phosphate can be prepared from 1'-demethyl-1'-(trityloxyethyl)-3,4-O-protected clindamycin 2- phosphate by the selective removal of the trityl and protective groups. The removal of these protective groups can be accomplished by a mild acid hydrolysis. For example, 1'-demethyl-1'-(trityloxyethyl)-3,4-O-anisylidene clindamycin 2-phosphate on being heated with 80% acetic acid at 100° C. for one-half to one hour yields 1'-demethyl-1'-(β-hydroxyethyl)clindamycin 2-phosphate. Acids such as formic, propionic, dilute hydrochloric and dilute sulfuric can also be used.

The desired 2-phosphate can be isolated from the reaction mixture by various techniques well known in the art or by following the special techniques illustrated with reference to clindamycin 2-phosphate. A suitable procedure is to subject the reaction mixture to gradient elution ion-exchange chromatography on quaternary ammonium resins such as Dowex 1-X2. A linear gradient of water, pH 9, going to ammonium acetate pH 9 will separate 1'-(β-hydroxyethyl)-1'-demethylclindamycin 2-phosphate from other by-products. The 1'-(β-hydroxyethyl)-1'-demethylclindamycin 2-phosphate peak is collected and freeze-dried. Ammonium acetate is removed with heat and inorganic phosphate is removed by saturating an aqueous solution of 1'-(β-hydroxyethyl)-1'-demethylclindamycin 2-phosphate with ammonia gas to precipitate diammonium phosphate. 1'-(β-Hydroxyethyl)-1'-demethylclindamycin 2-phosphate is obtained by freeze-drying the above aqueous solution to provide the mixed ammonium salts. Hemiammonium 1'-(β-hydroxyethyl)-1'-demethylclindamycin 2-phosphate is obtained by heating the above salt at 100° for three hours. The zwitterionic form of 1'-(β-hydroxyethyl)-1'-demethylclindamcyin 2-phosphate free of ammonia is obtained by heating the ammonium salt at 118°–120° for 8–24 hours under high vacuum and crystallizing the zwitterionic form.

An alternative procedure is to remove the inorganic phosphates before the acid-hydrolysis. This has the advantage that the 1'-(β-hydroxyethyl)-1'-demethylclindamycin 2-phosphate sometimes can be crystallized directly without the necessity of going through the ammonium salt form.

The novel compounds of the invention are amino acids and can exist in a protonated or a non-protonated form according to the pH of the environment. At low pH the compounds exist in the acid-addition salt form, at a higher pH in a zwitterion form, and at a still higher pH in a metal salt form. The latter can be a neutral salt (two equivalents of base for each mole of 1'-(β-hydroxyethyl)-1'-demethylclindamycin 2-phosphate), or a hemi salt (one-half equivalent of base for each mole of 1-(β-hydroxyethyl)-1'-demethylclindamycin 2-phosphate). By addition of appropriate amounts of suitable acids and bases, any of these various forms can be isolated. The acid addition salts include those of hydrochloric, sulfuric, phosphoric, acetic, succinic, citric, lactic, maleic, fumaric, pamoic, cholic, palmitic, mucic, camphoric, glutaric, glycolic, phthalic, tartaric, lauric, stearic, salicylic, 3-phenylsalicylic, 5-phenylsalicylic, 3-methylglutaric, ortho-sulfobenzoic, cyclohexanesulfamic, cyclopentanepropionic, 1,2-cyclohexanedicarboxylic, 4-cyclopentanepropionic, 1,2-cyclohexanedicarboxylic, 4-cyclohexenecarboxylic, octadecenylsuccinic, octenylsuccinic, methanesulfonic, benzenesulfonic, dimethyldithiocarbamic, cyclohexylsulfamic, hexadecylsulfamic, octadecylsulfamic, sorbic, undecylenic, octyldecylsulfuric, picric, benzoic, cinnamic, and like acids. Acid and neutral salts include the alkaline metal (including ammonia) and alkaline earth metal (including magnesium) salts obtained by neutralizing an acid form with the appropriate base, for example, ammonium hydroxide, sodium and potassium hydroxides, or alkoxides, calcium, or magnesium hydroxides, and the like. The acid and neutral salts also include amine salts obtained by neutralizing an acid form with a basic amine, for example, mono-, di-, and trimethylamines, mono-, di-, and triethylamines, mono-, di-, and tripropylamines (iso- and normal), ethyldimethylamine, benzyldiethylamine, cyclohexylamine, benzylamine, dibenzylamine, N,N'-dibenzylethylenediamine, bis-(ortho-methoxyphenylisopropyl)-amine, and like lower-aliphatic, lower-cycloaliphatic, and lower-araliphatic amines, the lower-aliphatic and lower-cycloaliphatic radicals containing up to and including eight carbon atoms; heterocyclic amines such as piperidine, morpholine, pyrrolidine, piperazine, and the lower-alkyl derivatives wherein lower alkyl contains one to eight carbon atoms, inclusive thereof such as 1-methylpiperidine, 4-ethylmorpholine, 1-isopropylpyrrolidine, 1,4-dimethylpiperazine, 1-n-butylpiperidine, 2-methylpiperidine and 1-ethyl-2-methylpiperidine; amines containing water solubilizing or hydrophilic groups such as mono-, di-, and triethanolamines, ethyldiethanolamine, n-butyl-monoethanolamine, 2-amino-1-butanol, 2-amino-2-ethyl-1,3-propanediol, 2-amino-2-methyl-1-propanol, tris-(hydroxymethyl)-aminomethane (THAM), phenylmonoethanolamine, p-tertiaryamylphenyldiethanolamine, and galactamine, N-methylglucamine, N-methylglucosamine, ephedrine, phenylephrine, epinephrine, and procaine; tetraethylammonium hydroxide; and guanidine. The various forms can be used interchangeably but for most purposes the zwitterion form, THAM and the hemiammonium salt forms are preferred.

STEP IV

The protective groups can be removed by hydrolysis, preferably, a mild acid hydrolysis. For example, protected 2-phosphates on being heated with 80% acetic acid at 100° C. for 10 to 15 min. yield the corresponding 1'-(β-hydroxyethyl)-1'-demethylclindamycin phosphate. Acids such as formic, propionic, dilute hydrochloric and dilute sulfuric can also be used.

The following examples are illustrative of the process and products of the present invention but are not to be construed as limiting.

EXAMPLE I

1'-Demethyl-1'-(β-hydroxyethyl)-3,4-isopropylidene-clindamycin

One hundred grams of 1'-demethyl-1'-(β-hydroxyethyl)-clindamycin, 100 g. of p-toluenesulfonic acid hydrate and 6 l. of acetone are stirred at 25° for 60 hours. The unreacted starting material is removed by filtration and the filtrate adjusted to pH 7 with 5% NaHCO$_3$ solution. The acetone is removed under vacuum and the aqueous phase extracted with CHCl$_3$. The CHCl$_3$ extracts are evaporated under vacuum to give a residue which is purified by chromatography over silica gel using a solvent system composed of CHCl$_3$:MeOH (6:1). The product fractions are identified by tlc, combined and evaporated to give 34 g. of 1'-demethyl-1'-

(β-hydroxyethyl)-3,4-isopropylidineclindamycin in 31% yield.

EXAMPLE II

1'-Demethyl-1'-(trityloxyethyl)-3,4-isopropylidineclindamycin

A mixture of 34 g. of 1'-demethyl-1'-(β-hydroxyethyl)-3,4-isopropylidineclindamycin, 115 g. of chlorotriphenylmethane, 1 l. of acetone and 200 ml. of triethylamine is heated at reflux for 4 hours. Skellysolve B (1 l.) is then added and the reaction mixture allowed to cool to 25°. The precipitate of triethylamine · HCl is removed by filtration and discarded. The filtrate is evaporated under vacuum and the residue purified by chromatography over silica gel using a solvent system composed of Skellysolve B:acetone (2:1). The product fractions are identified by tlc, combined and evaporated to give 20 g. of 1'-demethyl-1'-(trityloxyethyl)-3,4-isopropylidineclindamycin in 40% yield.

EXAMPLE III

1'-Demethyl-1'-(β-hydroxyethyl)clindamycin-2-cyanoethylphosphate

A mixture of 40 g. of 1'-demethyl-1'-(trityloxyethyl)-3,4-isopropylidine clindamycin, 400 ml. of a 1N pyridine solution of pyridinium cyanoethylphosphate, 160 g. of dicyclohexylcarbodiimide and 1 l. of pyridine is stirred under $N_2$ at 25° for 60 hours. Water (300 ml.) is then added, stirred well, and the reaction mixture cooled at 5° for 18 hours. The precipitate is removed by filtration, washed with 400 ml. of pyridine and the combined filtrate and washings evaporated to dryness under vacuum. The residue is dissolved in 500 ml. of dimethylformamide and evaporated to dryness under vacuum. The residue is dissolved in 400 ml. HOAc and 100 ml. water and heated at 95° for 30 minutes and then evaporated to dryness under vacuum. The residue is dissolved in 300 ml. of dimethylformamide and evaporated to dryness under vacuum. The residue is shaken with 300 ml. of EtOH, filtered and the filtrate evaporated to dryness. The residue is shaken with 100 ml. EtOH plus 200 ml. water at 25° for 1 hour, filtered and the filtrate evaporated to dryness under vacuum. The residue is purified by chromatography over silica gel using a solvent system composed of $CHCl_3:MeOH:H_2O$ (4:3:1). The product fractions are identified by tlc analysis, combined and evaporated under vacuum to give 30 g. of 1'-demethyl-1'-(β-hydroxyethyl)clindamycin 2-cyanoethylphosphate in 94% yield.

EXAMPLE IV

1'-Demethyl-1'-(β-hydroxyethyl)clindamycin 2-phosphate hydrate

A mixture of 30 g. of 1'-demethyl-1'-(β-hydroxyethyl)-clindamycin 2-cyanoethylphosphate, 500 ml. of concentrated $NH_4OH$ and 1 l. of water is stirred at 25° for 24 hours. The reaction mixture is filtered and the filtrate evaporated under vacuum to a volume of about 1 l. This solution is freeze dried and the residue dissolved in 1 l. of water and passed through a column of 1,400 g. of Dowex 1 × 8 resin, 20–50 mesh, acetate form. The column is washed with 2 l. of water and the product then eluted from the resin with 3% HOAc solution. The effluent is monitored by tlc and the product fractions combined and freeze dried. The residue is crystallized from acetone-water to give 9.5 g. of white crystalline product of 1'-demethyl-1'-(β-hydroxyethyl)-clindamycin 2-phosphate hydrate (a 35% yield) of m.p. 194°–196°.

Analysis:

Calc'd. for $C_{19}H_{36}ClN_2O_9PS \cdot (X) H_2O$
C, 42.65; H, 6.78; N, 5.24; S, 5.99; Cl, 6.63; P, 5.79.

Found: C, 42.85; H, 6.60; N, 5.33; S, 5.86; Cl, 6.51; P, 5.99. (Corrected for water)

$[\alpha]_D^{H20}$ +116° (c, 0.9428).

The compounds of the Formula I have clindamycin-like antibacterial activity, i.e., similar spectrum, but unexpectedly show a high concentration in the urinary tract, i.e., the kidney and upper and lower urinary tract thereby providing an effective treatment for bacterial infections of the upper and lower urinary tract as well as treatment of L-forms or mycoplasma in the kidney. Urinary tract infections such as cystitis, pyelonephritis and pyelitis when due to causative organisms, such as E. coli, S. aureus, enterococci and strains of Klebsiella, Aerobacter, Proteus and Pseudomonas can be treated.

The dosage in unesterified free base equivalents for such treatment can be from 75 mg. to 300 mg. daily or calculated on a weight basis from 1 mg./kg. to 4 mg./kg. body weight daily.

I claim:

1. A compound of the formula:

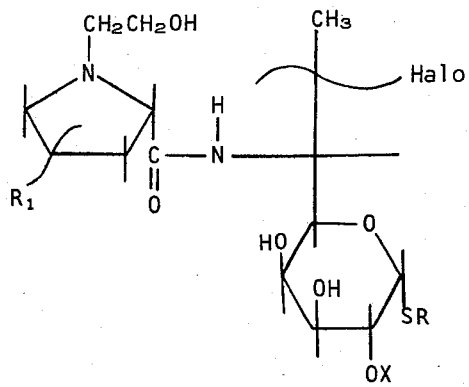

or the acid addition salts thereof wherein Halo is chlorine, bromine, or iodine, X is

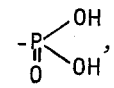

the zwitterion thereof or the hemi-salt thereof, inclusive; R is alkyl of not more than 4 carbon atoms; and $R_1$ is alkyl of not more than 8 carbon atoms.

2. A compound of claim 1 wherein $R_1$ is trans-propyl, R is methyl, Halo is chlorine and X is phosphate, or the acid addition salts thereof.

3. A compound of claim 2 wherein the acid addition salt is the hydrochloride.

* * * * *